US010534431B2

United States Patent
Erivantcev et al.

(10) Patent No.: US 10,534,431 B2
(45) Date of Patent: Jan. 14, 2020

(54) TRACKING FINGER MOVEMENTS TO GENERATE INPUTS FOR COMPUTER SYSTEMS

(71) Applicant: Finch Technologies Ltd., Road Town, Tortola (VG)

(72) Inventors: Viktor Vladimirovich Erivantcev, Ufa (RU); Rustam Rafikovich Kulchurin, Ufa (RU); Alexander Sergeevich Lobanov, Ufa (RU); Iakov Evgenevich Sergeev, Ufa (RU); Alexey Ivanovich Kartashov, Moscow (RU)

(73) Assignee: FINCH TECHNOLOGIES LTD., Fish Bay, Tortola (VG)

( * ) Notice: Subject to any disclaimer, the term of this patent is extended or adjusted under 35 U.S.C. 154(b) by 31 days.

(21) Appl. No.: 15/792,255

(22) Filed: Oct. 24, 2017

(65) Prior Publication Data

US 2018/0335843 A1    Nov. 22, 2018

Related U.S. Application Data

(60) Provisional application No. 62/507,085, filed on May 16, 2017.

(51) Int. Cl.
*G06F 3/01* (2006.01)
*G06F 3/0346* (2013.01)
(Continued)

(52) U.S. Cl.
CPC ............ *G06F 3/014* (2013.01); *A63F 13/211* (2014.09); *A63F 13/212* (2014.09);
(Continued)

(58) Field of Classification Search
CPC ................. G06F 3/03547; G06F 3/016; G06F 2203/0331; G06F 3/0362; G06F 3/0202;
(Continued)

(56) References Cited

U.S. PATENT DOCUMENTS 8,187,100 B1    5/2012  Kahn et al.
8,933,886 B2    1/2015  Imoto et al.
(Continued)

FOREIGN PATENT DOCUMENTS

| CN | 103226398 | 7/2013 |
| WO | 2016183812 | 11/2016 |
| WO | 2016209819 | 12/2016 |

OTHER PUBLICATIONS

Accessories for Vive, retrieved from https://www.vive.com/us/accessory/ on Jan. 30, 2017.
(Continued)

*Primary Examiner* — Vinh T Lam
(74) *Attorney, Agent, or Firm* — Greenberg Traurig, LLP

(57) ABSTRACT

A system including: a first sensor module having an inertial measurement unit and attached to a palm of a hand of a user; a second sensor module having an inertial measurement unit and attached to a first bone of a finger (e.g., a middle or proximal phalange bone) on the palm; and a computing device coupled to the first sensor module and the second sensor module to calculate, based on the orientation of the palm and the orientation of the first bone, orientations of the second bones of the finger (e.g., a distal or proximal phalange bone, a metacarpal bone of the thumb) that have no separately attached inertial measurement unit, according to a predetermined ratio of rotation from a reference orientation along a same axis of rotation.

19 Claims, 3 Drawing Sheets

(51) Int. Cl.
  *A63F 13/211* (2014.01)
  *A63F 13/212* (2014.01)
  *A63F 13/235* (2014.01)
(52) U.S. Cl.
  CPC ............ *A63F 13/235* (2014.09); *G06F 3/011* (2013.01); *G06F 3/017* (2013.01); *G06F 3/0346* (2013.01)
(58) Field of Classification Search
  CPC ........... G06F 3/0338; G06F 2203/0384; G06F 3/0487; G06F 3/0485; G06F 3/0325; G06F 3/012; G06F 3/041; G06F 3/0346; G06F 3/017; G06F 3/013; G06F 2203/04102; G06F 3/011; G06F 3/038; G06F 3/014; G06F 2203/012; G06T 19/006; G02B 27/0172; G02B 27/017; G02B 27/0093; G02B 2027/0178; G02B 2027/014; A63F 13/428; A63F 13/211; A63F 13/212; A63F 13/23; A63F 13/235; A63F 13/24
  See application file for complete search history.

(56) References Cited

U.S. PATENT DOCUMENTS

| | | | |
|---|---|---|---|
| 8,988,438 | B2 | 3/2015 | Bang et al. |
| 9,141,194 | B1 | 9/2015 | Keyes et al. |
| 9,278,453 | B2 | 3/2016 | Assad |
| 9,405,372 | B2 | 8/2016 | Yen et al. |
| D772,986 | S | 11/2016 | Chen et al. |
| 9,504,414 | B2 | 11/2016 | Coza et al. |
| 9,600,925 | B2 | 3/2017 | Katz et al. |
| 9,891,718 | B2 | 2/2018 | Connor |
| 9,996,945 | B1 | 6/2018 | Holzer et al. |
| 10,019,806 | B2 | 7/2018 | Perry et al. |
| 2003/0142065 | A1 | 7/2003 | Pahlavan |
| 2007/0050597 | A1 | 3/2007 | Ikeda |
| 2007/0273610 | A1 | 11/2007 | Baillot |
| 2008/0088468 | A1 | 4/2008 | Kim |
| 2009/0322763 | A1 | 12/2009 | Bang et al. |
| 2010/0079466 | A1 | 4/2010 | Griffin |
| 2011/0161804 | A1 | 6/2011 | Park et al. |
| 2012/0025945 | A1 | 2/2012 | Yazadi et al. |
| 2012/0130203 | A1 | 5/2012 | Stergiou et al. |
| 2012/0214591 | A1 | 8/2012 | Ito et al. |
| 2012/0293410 | A1 | 11/2012 | Bell |
| 2014/0028547 | A1 | 1/2014 | Bromley et al. |
| 2014/0201689 | A1* | 7/2014 | Bedikian .................. G06F 3/011 715/863 |
| 2014/0313022 | A1 | 10/2014 | Moeller et al. |
| 2015/0062086 | A1 | 3/2015 | Nattukallingal |
| 2015/0077347 | A1 | 3/2015 | OGreen |
| 2015/0145860 | A1 | 5/2015 | Craig et al. |
| 2015/0145985 | A1 | 5/2015 | Gourlay et al. |
| 2015/0277559 | A1 | 10/2015 | Vescovi et al. |
| 2015/0358543 | A1* | 12/2015 | Kord ........................ G06F 3/011 345/474 |
| 2016/0005232 | A1 | 1/2016 | Quarles |
| 2016/0054797 | A1* | 2/2016 | Tokubo .................... G06F 3/012 345/633 |
| 2016/0077608 | A1* | 3/2016 | Nakasu ................. G06F 3/0487 345/156 |
| 2016/0187969 | A1 | 6/2016 | Larsen et al. |
| 2016/0306431 | A1* | 10/2016 | Stafford .................. G06F 3/014 |
| 2016/0313798 | A1 | 10/2016 | Connor |
| 2016/0378204 | A1 | 12/2016 | Chen et al. |
| 2017/0053454 | A1 | 2/2017 | Katz et al. |
| 2017/0083084 | A1 | 3/2017 | Tatsuta et al. |
| 2017/0115728 | A1 | 4/2017 | Park et al. |
| 2017/0308165 | A1 | 10/2017 | Erivantcev et al. |
| 2017/0352188 | A1* | 12/2017 | Levitt .................... G06F 1/1626 |
| 2018/0095637 | A1 | 4/2018 | Valdivia et al. |
| 2018/0101989 | A1 | 4/2018 | Frueh et al. |
| 2018/0165879 | A1 | 6/2018 | Holzer et al. |
| 2018/0217680 | A1* | 8/2018 | Sudou .................... G06F 3/0481 |
| 2018/0225517 | A1 | 8/2018 | Holzer et al. |
| 2018/0253142 | A1 | 9/2018 | Tsuchie et al. |
| 2018/0313867 | A1 | 11/2018 | Erivantcev et al. |
| 2018/0335834 | A1 | 11/2018 | Erivantcev et al. |
| 2018/0335855 | A1 | 11/2018 | Erivantcev et al. |
| 2019/0187784 | A1 | 6/2019 | Erivantcev at al. |

OTHER PUBLICATIONS

Daydream, retrieved from https://vr.google.com/daydream/ on Jan. 30, 2017.
Forward kinematics, Wikipedia, retrieved from https://en.wikipedia.org/wiki/Forward_kinematics on Sep. 21, 2017.
Gest—Work with your hands. Wayback Machine 2016. Retrieved from https://web.archive.org/web/20160304012247/https://gest.co/ on Jan. 30, 2017.
Gloveone: Feel Virtual Reality. Wayback Machine 2016. Retrieved from https://web.archive.org/web/20160307080001/https://www.gloveonevr.com/ on Jan. 30, 2017.
International Application No. PCT/US2017/028982, International Search Report and Written Opinion, dated Aug. 24, 2017.
Manus VR—The Pinnacle of Virtual Reality Controllers, Manus VR Development Kit Pro Q4 2016.
Manus VR—The virtual reality dataglove for consumers. Wayback Machine 2016. Retrieved from https://web.archive.org/web/20160417035626/https://manusvr. com/ on Jan. 30, 2017.
NeuroDigital: The VR Technology Factory, retrieved from https://www.neurodigital.es/ on Jan. 30, 2017.
Oculus Rift | Oculus. Retrieved from https://www3.oculus.com/enus/ rift/ on Jan. 30, 2017.
RevolVR Virtual Reality Controllers, retrieved from http://revolvr.co/ on Jan. 30, 2017.
Wireless Gaming Controllers for PC, Mac, and Mobile | SteelSeries, retrieved from https://steelseries.com/gamingcontrollers on Jan. 30, 2017.
Xbox Wireless Controller, retrieved from http://www.xbox.com/en-US/xbox-one/accessories/controllers/xbox-wireless-controller on Jan. 30, 2017.
Devices for Controlling Computers Based on Motions and Positions of Hands, U.S. Appl. No. 15/492,915, filed Apr. 20, 2017, Viktor Erivantcev, et al, Docketed New Case—Ready for Examination, Status Date: Nov. 16, 2018.
Calibration of Inertial Measurement Units Attached to Arms of a User to Generate Inputs for Computer Systems, U.S. Appl. No. 15/817,646, filed Nov. 20, 2017, Viktor Erivantcev, et al, Docketed New Case—Ready for Examination, Status Date: Jan. 10, 2018.
Tracking Arm Movements to Generate Inputs for Computer Systems, U.S. Appl. No. 15/787,555, filed Oct. 18, 2017, Viktor Erivantcev, et al, Non Final Action dated Nov. 9, 2018.
Tracking Torso Orientation to Generate Inputs for Computer Systems, U.S. Appl. No. 15/813,813, filed Nov. 15, 2017, Viktor Erivantcev, et al, Docketed New Case—Ready for Examination, Status Date: Jan. 17, 2018.
Calibration of Inertial Measurement Units Attached to Arms of a User and to a Head Mounted Device, U.S. Appl. No. 15/847,669, filed Dec. 19, 2017, Viktor Erivantcev, et al, Docketed New Case—Ready for Examination, Status Date: Feb. 2, 2018.
Correction of Accumulated Errors in Inertial Measurement Units Attached to a User, U.S. Appl. No. 15/868,745, filed Jan. 11, 2018, Viktor Erivantcev, et al, Docketed New Case—Ready for Examination, Status Date: Mar. 2, 2018.
Tracking Torso Leaning to Generate Inputs for Computer Systems, U.S. Appl. No. 15/864,860, filed Jan. 8, 2018, Viktor Erivantcev, et al, Docketed New Case—Ready for Examination, Status Date: Feb. 12, 2018.
Tracking User Movements to Control a Skeleton Model in a Computer System, U.S. Appl. No. 15/973,137, filed May 7, 2018, Viktor Erivantcev, et al, Docketed New Case—Ready for Examination, Status Date: Jul 2, 2018.
Motion Predictions of Overlapping Kinematic Chains of a Skeleton Model Used to Control a Computer System, U.S. Appl. No. 15/996,389,

(56) References Cited

OTHER PUBLICATIONS filed Jun. 1, 2018, Viktor Erivantcev, et al, Docketed New Case—Ready for Examination, Status Date: Jul. 25, 2018.
Calibration of Measurement Units in Alignment with a Skeleton Model to Control a Computer System, U.S. Appl. No. 16/044,984, filed Jul. 25, 2018, Viktor Erivantcev, et al, Docketed New Case—Ready for Examination, Status Date: Aug. 27, 2018.
Devices for Controlling Computers Based on Motions and Positions of Hands, U.S. Appl. No. 15/492,915, filed Apr. 20, 2017, Viktor Erivantcev, et al, Non Final Action dated Apr. 18, 2018.
Tracking Arm Movements to Generate Inputs for Computer Systems, U.S. Appl. No. 15/787,555, filed Oct. 18, 2017, Viktor Erivantcev, et al, Docketed New Case—Ready for Examination, Status Date: Jan. 9, 2018.
Forward kinematics, Wikipedia, printed on Sep. 21, 2017.

* cited by examiner

TRACKING FINGER MOVEMENTS TO GENERATE INPUTS FOR COMPUTER SYSTEMS

RELATED APPLICATIONS

The present application claims the benefit of the filing date of Prov. U.S. Pat. App. Ser. No. 62/507,085, filed May 16, 2017 and entitled "Methods, Systems, and Apparatuses for Calculating the Position of a Skeletal 3-D Model in Space using Predictive Interpolation Algorithms", the entire disclosure of which is hereby incorporated herein by reference.

The present application relates to U.S. patent application Ser. No. 15/787,555, filed Oct. 18, 2017 and entitled "Tracking Arm Movements to Generate Inputs for Computer Systems", and U.S. patent application Ser. No. 15/492,915, filed Apr. 20, 2017 and entitled "Devices for Controlling Computers based on Motions and Positions of Hands", which claims the benefit of the filing dates of 62/325,925, filed Apr. 21, 2016 and entitled "Hand-Worn Devices for Controlling Computers based on Motions and Positions of Hands and Fingers", Prov. U.S. Pat. App. Ser. No. 62/463,183, filed Feb. 24, 2017 and entitled "Devices for Controlling Computers based on Motions and Positions of Hands and Arms," Prov. U.S. Pat. App. Ser. No. 62/463,209, filed Feb. 24, 2017 and entitled "Devices for Controlling Computers based on Motions and Positions of Hands," Prov. U.S. Pat. App. Ser. No. 62/463,252, filed Feb. 24, 2017 and entitled "Devices for Controlling Computers based on Motions and Positions of Hands and Arms," the entire disclosures of which applications are hereby incorporated herein by reference.

FIELD OF THE TECHNOLOGY

The embodiments disclosed herein relate to computer input devices in general and more particularly but not limited to input devices for virtual reality and/or augmented/mixed reality applications implemented using computing devices, such as mobile phones, smart watches, similar mobile devices, and/or other devices.

BACKGROUND

U.S. Pat. App. Pub. No. 2014/0028547 discloses a user control device having a combined inertial sensor to detect the movements of the device for pointing and selecting within a real or virtual three-dimensional space.

U.S. Pat. App. Pub. No. 2015/0277559 discloses a finger-ring-mounted touchscreen having a wireless transceiver that wirelessly transmits commands generated from events on the touchscreen.

U.S. Pat. App. Pub. No. 2015/0358543 discloses a motion capture device that has a plurality of inertial measurement units to measure the motion parameters of fingers and a palm of a user.

U.S. Pat. App. Pub. No. 2007/0050597 discloses a game controller having an acceleration sensor and a gyro sensor.

U.S. Pat. No. D772,986 discloses the ornamental design for a wireless game controller.

Chinese Pat. App. Pub. No. 103226398 discloses data gloves that use micro-inertial sensor network technologies, where each micro-inertial sensor is an attitude and heading reference system, having a tri-axial micro-electromechanical system (MEMS) micro-gyroscope, a tri-axial micro-acceleration sensor and a tri-axial geomagnetic sensor which are packaged in a circuit board. U.S. Pat. App. Pub. No. 2014/0313022 and U.S. Pat. App. Pub. No. 2012/0025945 disclose other data gloves.

The disclosures of the above discussed patent documents are hereby incorporated herein by reference.

BRIEF DESCRIPTION OF THE DRAWINGS

The embodiments are illustrated by way of example and not limitation in the figures of the accompanying drawings in which like references indicate similar elements.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

At least some embodiments disclosed herein allow finger movement tracking without sensor devices attached to some of the phalange bones and the metacarpal bone(s) that may move independently from each other to some degrees. For example, the orientations of phalange bones and/or the metacarpal bone of the thumb that have no attached motion sensor devices are estimated, predicted, or computed from the orientations of the phalange bones that have motion sensor devices attached thereon, as further described below.

In general, multiple-sensor, hand-worn devices can be used for motion capturing and positioning of hand and fingers in virtual reality ("VR") or augmented/mixed reality ("AR") applications (collectively, "VR/AR" applications) and controlling computing devices via gesture recognition. The hand-worn devices can be used for interaction with VR/AR applications implemented on mobile platforms for data input and/or control interface, in systems for training, simulation, playing, gaming, etc.

For example, hand-worn devices can be used to enter information into the computing device (including mobile devices) in interaction with a VR/AR application and in normal use without a VR/AR environment. The hand-worn devices are easy and convenient to use in entering information into computing devices during a VR/AR interaction and outside VR/AR interaction.

For example, hand-worn devices can be used to provide low latency visualization of hands movements in VR/AR space, allow virtual QWERTY keyboard with typing speed comparable to tablet/smartphone, and facilitates gesture inputs corresponding to moving, shooting, boxing, pointing, picking, selecting using ergonomic finger movements and touch pad activation (without limitation to other types of input gestures). The hand-worn devices can also be used to implement intuitive gestures that are standard on touch screen on smartphones and mouse-based graphical user interfaces, such as sliding, swiping, zooming, selecting, pointing, and clicking. Tracking of the positions and orientations of the finger bones can improve the accuracy of the input generated via the hand-worn devices.

Figure 1:
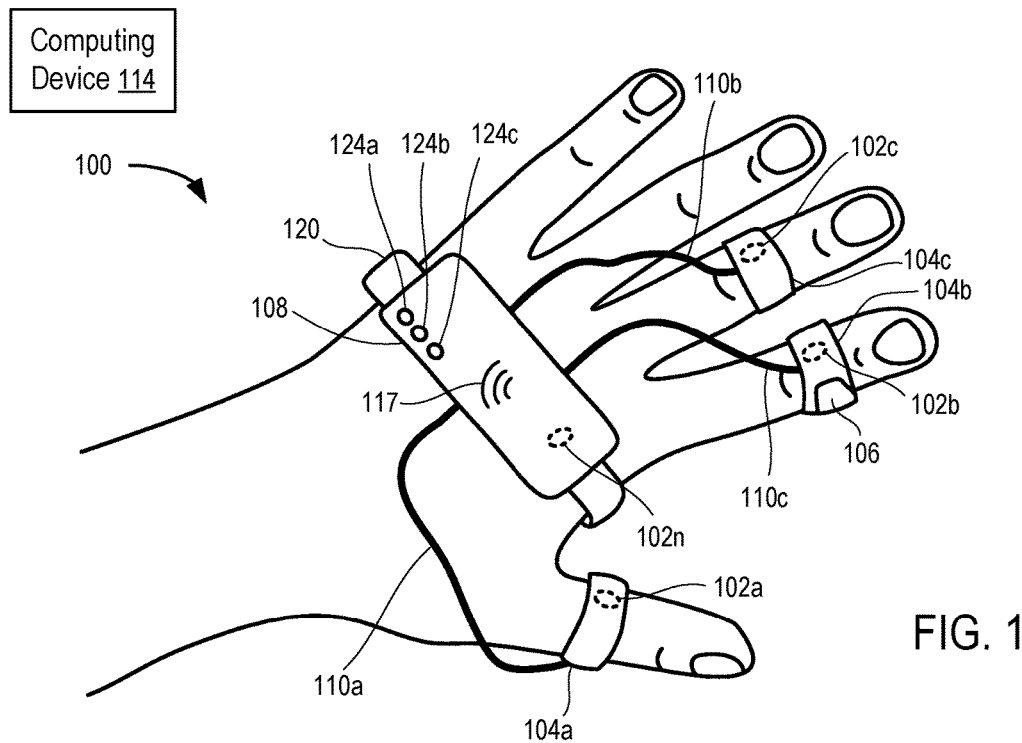
FIG. 1 illustrates a system to track finger movements according to one embodiment.

FIG. 1 illustrates a system to track finger movements according to one embodiment.

In FIG. 1, a hand-worn data input device (100) includes a plurality of finger modules (104a-c) and a palm module (108). Each of the finger modules (104a-c) is configured as a ring worn on a phalange bone of a finger of a hand of a user, such as the proximal phalange of the thumb, and the middle phalange bones of the index finger, middle finger, the ringer finger, and the little finger (pinky) of the hand.

Each of the finger modules (104a-c) has an inertial sensor (102a-c) that measures the orientation of a finger bone on which the corresponding finger module (104a-c) is worn. The palm module (108) has an inertial sensor (102n) that measures the orientation of the palm of the hand.

For example, an inertial sensor can be implemented using a micro-electromechanical system (MEMS) inertial measurement unit (IMU).

For example, each of the IMUs (102a-c and 102n) has a collection of sensor components that enable the determination of the movement, position and/or orientation of the respective IMU along a number of axes. Examples of the components are: a MEMS accelerometer that measures the projection of acceleration (the difference between the true acceleration of an object and the gravitational acceleration); a MEMS gyroscope that measures angular velocities; and a magnetometer that measures the magnitude and direction of a magnetic field at a certain point in space. In some embodiments, the IMUs use a combination of sensors in three and two axes (e.g., without a magnetometer).

Optionally, a ring module (e.g., 104b) may further include a touch pad (106) mounted on the ring (104b) and adapted to receive touch inputs activated by the thumb of the same hand of the user and/or one or more click buttons incorporated into the touch pad mount.

A set of cables (110a-c) communicatively connect the rings modules (102a-c) to the palm module (108), which communicates to a computing device (114), via a wireless communication connection (117), inputs generated based on the sensor data of the rings modules (102a-c) and the palm module (108).

Figure 2:
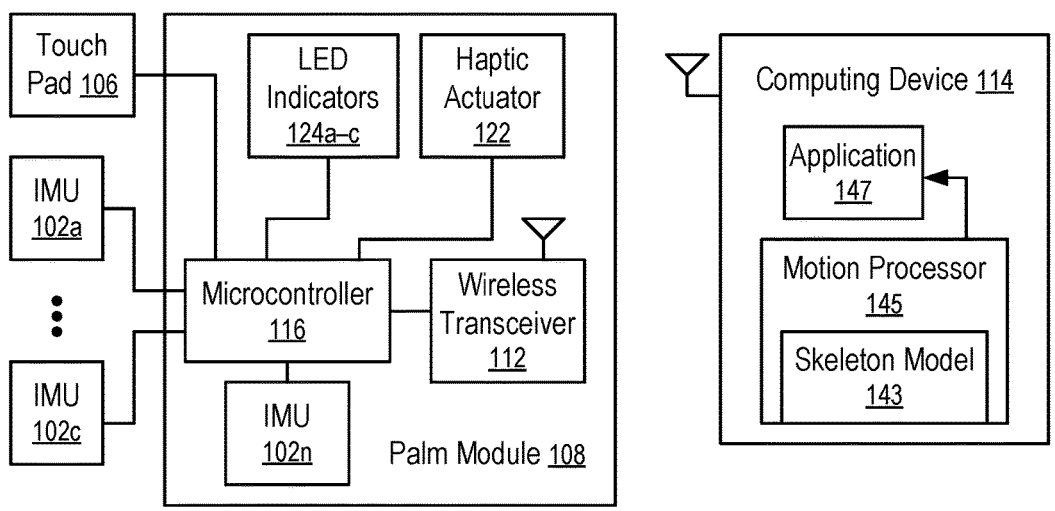
FIG. 2 illustrates a system to control computer operations according to one embodiment.

Some components of the palm module (108) and the computing device (114) of FIG. 1 are illustrated in FIG. 2. For example, the palm module (108) illustrated in FIG. 2 includes an IMU (102n), a microcontroller unit ("MCU") (116), a wireless transceiver (112) for establishing the wireless communication connection (117), an optional haptic actuator (122), and one or more LED indicators (124a-c).

In FIG. 1, the palm module (108) is adapted to be secured to the back of the palm of the hand via a strap (120) that wraps around the palm of the hand and configured to collect sensor data from the inertial sensors (104a-c) of the finger modules (102a-n) and the touch pad (106) and perform initial processing of the sensor data using the microcontroller unit ("MCU") (116) of the palm module (108) to generate the input data for the computing device (114).

The wireless transceiver (112) is housed within the palm module (108) and used to establish the wireless communication link (117) with the computing device (114). The wireless communication link (117) can be a personal area wireless network connection (e.g., Bluetooth connections), or a local area wireless network connection (e.g., Wi-Fi connections). Through the wireless communication link (117), the palm module (108) transmits the results of the initial processing performed by the MCU (116) to the computing device (e.g., a mobile phone, a smart watch, a personal media player, a tablet computer, a personal computer, a notebook computer, etc.) to control an application (147) running in the computing device (114).

The haptic actuator (122) provides haptic sensory feedback to the user.

The LED indicators (124a-c) (and/or other display devices) configured on the palm module (108) and/or one or more of the rings (104a-c) can be used to provide visual feedback to the user and to indicate the operation status of the hand worn device (100).

Optionally, a camera that generates additional inputs based on the signals from the LED lights (124a-c) (and/or other display devices) may be included.

The MCU (116) of the palm module (108) may include a memory storing instructions controlling the operation of the MCU (116) to perform primary processing of the sensor data and to control the operation of the input device (100).

As illustrated in FIG. 2, the computing device (114) includes a motion processor (145) that further process the input data received from the palm module (108) via the wireless communication link (117) and generate inputs to an application (147) running in the computing device (114), which may be a personal computer, a tablet computer, a smartphone, a personal media player, etc. The application (147) performs application-specific actions in response to the input from the motion processor (145).

An IMU (e.g., 102a-c, or 102n) of the input device (100) may measure its movement along three axes. For each of the axes, it may use a MEMS accelerometer to measure the difference between its true acceleration and its gravitational acceleration, and a MEMS gyroscope to measure its angular velocity, and a magnetometer configured to measure the magnitude and direction of the magnetic field at its location in space. Thus, the orientation of the module in which the IMU is installed can be measured relative to a common reference system (e.g., the wrist of the user, the room in which the user is located, a location on the Earth where the user is positioned).

In some embodiments, the IMUs (102a-n) mounted on some of the components perform measurements only along two axes. For example, the IMU (102n) in the palm module (108) measures along three axes, while the IMUs (102a-c) mounted in the rings measure alone two axes (and without magnetometer). Thus, the overall cost of the input device (100) can be reduced.

In FIG. 1, the touch pad (106) is mounted on a ring (104b) adapted to be touched by the thumb of the same hand. The touch pad (106) can be formed by the capacitive sensor technologies. Preferably, the touch pad (106) has a diameter of 1.2 to 1.5 cm (or oval form with dimensions 1.2 to 1.5 cm height and 1.5 to 2.0 cm length), located on the outer lateral side of the ring (104b) on the index finger. The touch pad (106) can also be implemented using alternative technologies, such as resistive sensors, analog stick, compact optical sensors, Hall-effect sensor, piezoelectric sensors, etc.

The rings of the finger modules (104a-c) may or may not be fully closed.

In FIG. 1, the MCU (116) of the palm module (108) gathers the sensor signals from the IMUs (102a-n) and touch pad (106), carries out the processing, and transfers the input data to the computing device (114) via the wireless transceiver (112) (e.g., via Bluetooth or Wi-Fi).

Alternative, a wired connection between the palm module (108) and the computing device (114) can be used to communicate the input signal from the palm module (108) to the computing device (114). The input device (100) may be powered via the wired connection and/or charge the battery of the input device (100) through the wired connection.

The input device (100) can be powered by a battery for the operations of generating the input signals. The battery can be housed in the palm module (108); and the palm module can be configured with a port for charging the battery and for a wire connection to the computing device (114).

Optionally, one or more additional inertial sensors can be mounted on one or more of: the ring finger, the little finger, the wrist, the forearm, the upper arm, the chest, and a feet, an ankle (e.g., for a full suit option). In these and other embodiments, the inertial sensor may include an optional wireless transceiver and battery/accumulator. When the optional transceiver is used, the palm module (108) may further include an additional receiver device to collect the sensor data sent by these additional IMUs. Alternatively, the additional inertial sensor/IMUs may transmit their sensor data directly to the computing device (114)

For example, an additional inertial sensor (IMU) can be configured in an armband to be worn in the biceps area above elbow; the combination of the sensor data from the armband and the sensor data from the hand worn device (100) having the palm module (108) and the finger rings (104a-c) allows for accurate determination of the position of the hand in a three dimensional space without a need for an inertial sensor on the forearm, as further discussed in U.S. patent application Ser. No. 15/787,555, filed Oct. 18, 2017 and entitled "Tracking Arm Movements to Generate Inputs for Computer Systems", the entire disclosure of which is hereby incorporated herein by reference.

Optionally, the input device (100) includes visual indicators (e.g., LED indicators (124a-c)) that are configured to indicate the operation statuses of the input device (100) and/or the processed data. In general, the indicators can be housed on the palm module (108), or mounted on one or more of the rings (104a-c). In some instances, the indicators are arranged to form a placard.

In FIG. 1, three rings (104a-c) are configured for the thumb, the index finger and the middle finger. Optionally, rings can be provided for each of the five fingers. In other embodiments, an input device (100) having fewer rings than that illustrated in FIG. 1 can be used.

Optionally, the input device (100) includes a haptic actuator (122), such as a vibrational motor (actuator) to provide feedback to some or each of the finger modules (104a-c), the palm module (108), and/or additional modules.

After the user wears the input device (100) on a hand and launches an application on the computing device (114) that uses the input device (100), the input data generated by the MCU (116) based on the inertial sensor data is transmitted from the device (100) to the computing device (114) via a wireless connection and/or a wired connection(s). The motion processor (145) of the computing device (114) calculates the orientations and positions of the bones of the fingers, recognizes gestures from the input data, and provides inputs to the application (147) to perform actions that are triggered by the gestures or inputs. In some instances, the motion processor (145) is configured in the palm module (108).

For example, the MCU (116) reads data from the IMUs (102a-c and 102n) and the touch pad (106). The data is processed (e.g., filtered, normalized, and standardized). The input device (100) forms a data packet containing a processed data from the IMUs (102a-c and 102n) and the touch pad (106) and transmits the data packet to the computing device (114), which may be a personal computer, a tablet computer, a smartphone, a personal media player, etc. System software on the computing device (114) is configured to process the input data to recognize gestures indicated in the input data and/or other standardized input events. Application software receives input events from the system software and performs application specific operations corresponding to the input events.

Optionally, each of the finger modules (104a-c) has a wireless transceiver to transmit its sensor data to the palm module (108) and/or to the computing device (114); and thus the wire connections (110a-c) can be eliminated.

In general, the data set received from the sensor modules (102a-c and 102n) includes gyroscope data for each axis of measurement, accelerometer data for each axis, and/or optional magnetometer data for each axis.

Preferably, the palm module (108) computes the rotations (e.g., in the form of quaternions) from the gyroscope data. Optionally, approximate spatial coordinates of the hand/wrist with respect to an initial position are computed from the accelerometer data. Further, the palm module (108) uses the data set received from the touch pad (106) to identify the position coordinates of the finger touch on the touch pad (106), clicking events, and squeezing events.

The palm module (108) transmits the processed data from the input device (100) to the computing device (114), which may be a smartphone, a desktop computer, a head mount display device, and a smart watch. The data transmitted from the palm module (108) to the computing device (114) may include: gyroscope vector, acceleration vector, orientation/rotation, coordinates of the hand/wrist, touch data from the touch pad (106), etc.

System software performs low-level functions of the system in the background and generally does not have a GUI for the user. The system software retrieves data from the input device (100), handling and forwarding the input to application software on demand.

Application software implements the application-specific function and usually has a graphical interface. For example, application software may implement a virtual reality (or augmented/mixed reality) game. Using a set of tools and documentations of the system software, a developer may create application software for a specific purpose using the input from the input device (100).

The input device (100) illustrated in FIG. 1 and/or FIG. 2 may further include: vibration haptic actuators (122) (e.g., installed inside the palm module (108) and connected to the MCU (116) or, optionally, at some or each of the finger rings (104a-c)); one or more optional ultrasound receivers (e.g., microphones mounted inside the palm module (108) and connected to the MCU (116)); and one or more optical markers (active or passive, e.g., lit or not lit) on the surface of the palm module (108) for optical tracking of the input device (100).

The input device (100) as illustrated in FIG. 2 further includes a receiver (e.g., wireless transceiver (112) or a receiver for a wired connection) that is connected to the MCU (116), where the receiver is connected with complementary IMUs incorporated into additional bands (e.g., to be worn on arms, wrists, the forearms, chest, feet, ankles, etc.) and/or rings (e.g., to be worn on fingers), where each of the bands and rings includes an IMU, a communication device (e.g., a transceiver for wireless or wired communications), and/or a power source (e.g., battery/accumulator).

In FIG. 2, the motion processor (145) includes a skeleton model (143) of the hand wearing the input device (100).

Using the skeleton model (143), the motion processor (147) estimates, predicts, or computes the orientation and positions of individual phalange bones and/or the metacarpal bone of the thumb without the need to attach inertial sensors to the metacarpal bone of the thumb and some of the phalange bones, such as the distal phalange bones of the fingers and the proximal phalange bones of the index finger, the middle finger, the ringer finger, and the little finger (pinky).

FIG. 2 illustrates an example of implementing a motion processor (145) in the computing device (114). Alternatively, the motion processor (145) can be implemented at least in part via the MCU (116) of the palm module (108). For example, the palm module (108) may calculate the positions and orientations of the bones of the hand in additional to, or as replacement of, the positions and orientations of the IMUs (102a-c, 102n).

Figure 3:
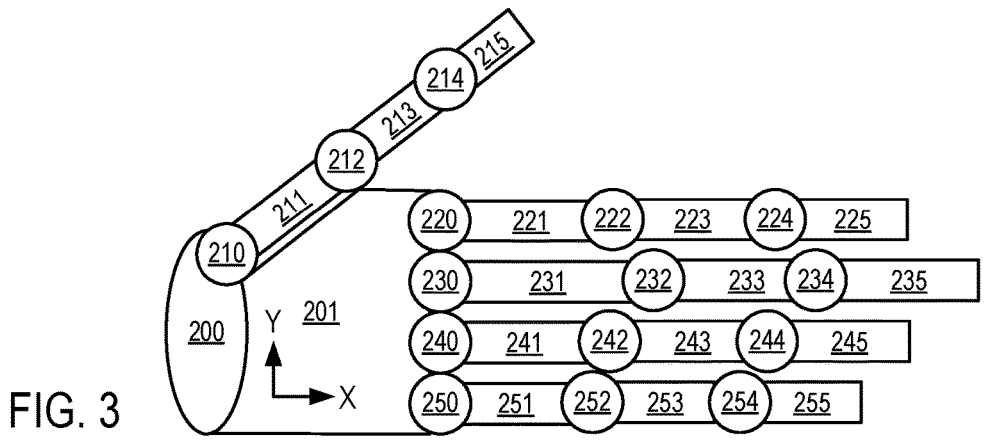
FIG. 3 illustrates a skeleton model of a hand.

FIG. 3 illustrates a skeleton model of a hand. For example, the skeleton model of FIG. 3 can be used in the motion processor (145) of FIG. 2.

In FIG. 3, the hand is modeled to have: a wrist (200); a palm (201); a thumb (210-214) connected to the palm (201) and/or the wrist (200) via a joint (210); and an index finger (220-225), a middle finger (230-235), a ring finger (240-245), and a little finger (250-255) connected respectively to the palm (201) via joints (220, 230, 240, and 250).

The thumb (210-214) has a metacarpal bone (211), a proximal bone (213), a distal phalange bone (215), and joints (212 and 214) connecting the bones (211, 213, 215) of the thumb.

The index finger (220-225) has a proximal phalange bone (221), a middle phalange bone (223), a distal phalange bone (225), and joints (222 and 224) connecting the bones (221, 223, 225) of the index finger.

The middle finger (230-235) has a proximal phalange bone (231), a middle phalange bone (233), a distal phalange bone (235), and joints (232 and 234) connecting the bones (231, 233, 235) of the middle finger.

The ring finger (240-245) has a proximal phalange bone (241), a middle phalange bone (243), a distal phalange bone (245), and joints (242 and 244) connecting the bones (241, 243, 245) of the ring finger.

The little finger (250-255) has a proximal phalange bone (251), a middle phalange bone (253), a distal phalange bone (255), and joints (252 and 254) connecting the bones (251, 253, 255) of the little finger.

Figure 4:
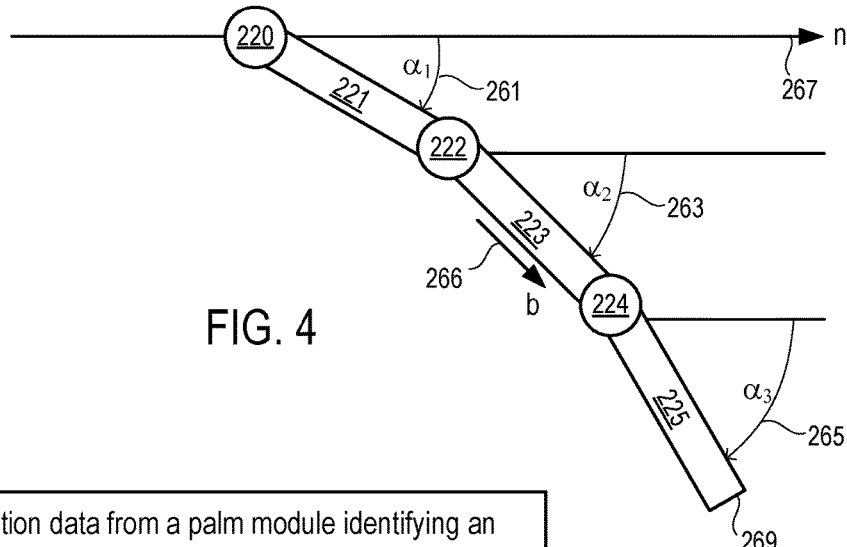
FIG. 4 illustrates the determination of the orientation of a finger according to one embodiment.

In the skeleton model of FIG. 3, the joints of the fingers allow the finger bones to move independent from each other to some degrees and to rotate from a reference position (e.g., when the fingers are naturally extended in an open hand position) to a current position along a same axis of rotation for each finger, as illustrated in FIG. 4.

FIG. 4 illustrates the determination of the orientation of a finger according to one embodiment.

In FIG. 4, the direction n (267) represents a reference direction of the finger (e.g., when the finger is extended straight in an open hand position relative to the palm (201) and/or the wrist (202).

When the finger bends to the position illustrated in FIG. 4, the bones (221, 223, and 225) are assumed to be aligned in the plane that contains the bones (221, 223, 225) and the reference direction n (267). Thus, the finger bones (221, 223, 225) can be considered to have been rotated in the plane alone the same axis that is perpendicular to the plane with different angles $\alpha_1$ (261), $\alpha_2$ (263), and $\alpha_3$ (265).

The axis of rotation or the plane of rotation is not pre-determined. The axis of rotation and the plane of rotation can be determined from the current orientation of a finger bone (e.g., 223) measured via a finger module (e.g., 106) and the reference direction (267) relative to the palm (201). For example, the current orientation of the finger bone (223) of the finger identifies the direction b (266) that is parallel to the lengthwise direction of the finger bone (223). The lengthwise direction b (226) and the reference direction n (267) define the plane of rotation; and the axis of rotation is perpendicular to the plane and thus the lengthwise direction b (226) and the reference direction n (267).

In the skeleton model of FIG. 3, the angles $\alpha_1$ (261), $\alpha_2$ (263), and $\alpha_3$ (265) have a predetermined ratio. For example, the ratio of $\alpha_1:\alpha_2:\alpha_3=0.25:0.54:1.0$ can be used for the thumb; and the ratio of $\alpha_1:\alpha_2:\alpha_3=0.42:0.74:1.0$ can be used for fingers other than the thumb.

In one implementation, the ratio $\alpha_1:\alpha_2:\alpha_3$ is constant and independent of the current position of the finger. Alternatively, a look up table can be used to determine the ratio for a current position of the finger (e.g., identified by one of the angles (e.g., $\alpha_2$) that is measured using a finger module (e.g., 104b). The constant ratio and/or the look up table may be customized for a user using a calibration process.

Since the angles $\alpha_1$ (261), $\alpha_2$ (263), and $\alpha_3$ (265) of the skeleton model of FIG. 3 have a predetermined ratio, the motion processor (145) can compute the angles of finger bones that have no a ring modules attached to, based on the angle of the finger bone that has a ring module attached to.

For example, when a ring module (104b) is used to track the orientation of the finger bone (223), the angle $\alpha_2$ (263) can be calculated from the orientation of the finger bone (223) and the reference direction n (267). The predetermined ratio among the angles $\alpha_1$ (261), $\alpha_2$ (263), and $\alpha_3$ (265) can be used to scale the rotation angle $\alpha_2$ (263) to obtain the rotation angles $\alpha_1$ (261), and $\alpha_3$ (265). Thus, the orientations of the finger bones (221 and 225) can be estimated, predicted, or calculated according to the skeleton model of FIG. 3.

Preferably, the ring module (104b) is used to track the orientation of the finger bone (223) that is the middle segment of the finger in the skeleton model of the hand illustrated in FIG. 3. Alternatively, the ring module (104b) can be used to track the orientation of the finger bone (225) that is the distal segment of the finger in the skeleton model of the hand illustrated in FIG. 3, or the orientation of the finger bone (221) that is the proximal segment of the finger in the skeleton model of the hand illustrated in FIG. 3.

Once the orientations of the finger bones (221, 223, and 225) are determined, the positions of the finger bones and/or the position of the fingertip (269) in the three dimensional space can be calculated according to the skeleton model of FIG. 3 (e.g., to generate an input for the application (147)).

FIG. 4 illustrates the determination of the orientations of the bones of the index finger having bones (221, 223, 225) in the skeleton model illustrated in FIG. 3. The orientations of the bones of other fingers in the skeleton model of FIG. 3. can be determined in a similar way.

When no finger modules are worn on the ring finger (240-245) and/or the little finger (250-255), the motion processor (145) assumes that the finger bones (241, 243, 245) of the ring finger and/or the finger bones (251, 253, 255) of the little finger have rotated with respect to their references directions by the same angles as the corresponding bones (231, 233, 235) of the middle finger (230-235).

The reference directions (e.g., n (267)) are predefined relative to the palm (201). Preferably, the reference directions for the index finger (220-225), the middle finger (230-235), the ring finger (240-245) and the little finger (250-255) are in the same direction that is parallel to the plane of the palm (201) and parallel to the palm direction X pointing from the wrist (200) to the palm (201).

The reference direction for the thumb is not parallel to the plane of the palm (201). For example, the reference direction for the thumb has a component of 0.25 in a direction parallel to the palm direction X from the wrist (200) to the palm (201), a component of 0.86 in the palm direction Y from the edge of the palm (201) towards the thumb (211), and a component of 0.46 in the direction Z perpendicular to the palm (201).

Figure 5:
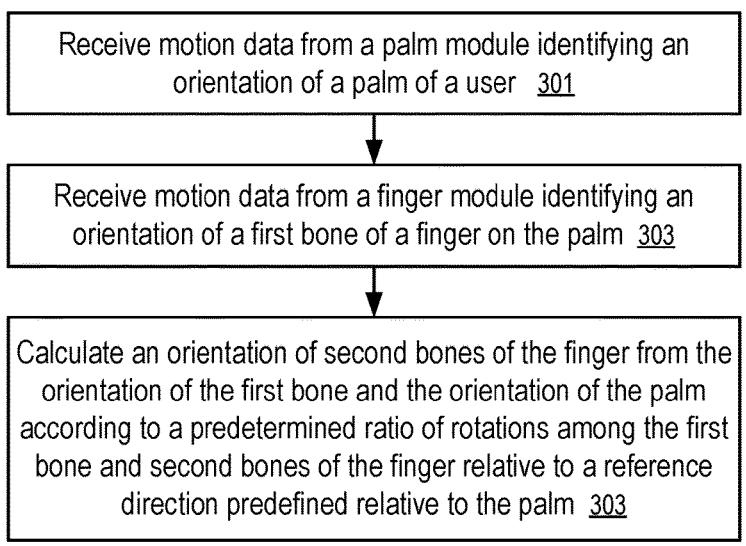
FIG. 5 shows a method to compute the orientation of a finger according to one embodiment.

FIG. 5 shows a method to compute the orientation of a finger according to one embodiment. For example, the method of FIG. 5 can be implemented in a system illustrated in FIG. 2 with a palm module (108) attached to the palm (201) of a user and a plurality of finger modules (104a-c) attached to selected finger bones in a way illustrated FIG. 1 and using the geometrical relations identified via FIG. 3 and FIG. 4.

In FIG. 5, a computing device (141) is configured to: receive (301) motion data from a palm module (108) identifying an orientation of a palm (201) of a hand of a user; receive (303) motion data from a finger module (e.g., 104a, 104b, or 104c) identifying an orientation of a first bone (e.g., 213, 223, or 233) of a finger (e.g., a thumb, an index finger, a middle finger) on the palm (201) of the hand; and calculate (303) an orientation of second bones (e.g., 211, 215; 221, 225; or, 231 or 235) of the finger from the orientation of the first bone (e.g., 213, 223, or 233) and the orientation of the palm (201) according to a predetermined ratio of rotations among the first bone and second bones of the finger relative to a reference direction n (267) predefined relative to the palm (201). Thus, there is no need to attach separate finger modules to the second bones (e.g., 211, 215; 221, 225; or, 231, 235) of the finger in order to determine the orientations and positions of all of the finger bones and/or the positions of the tip of the finger.

Figure 6:
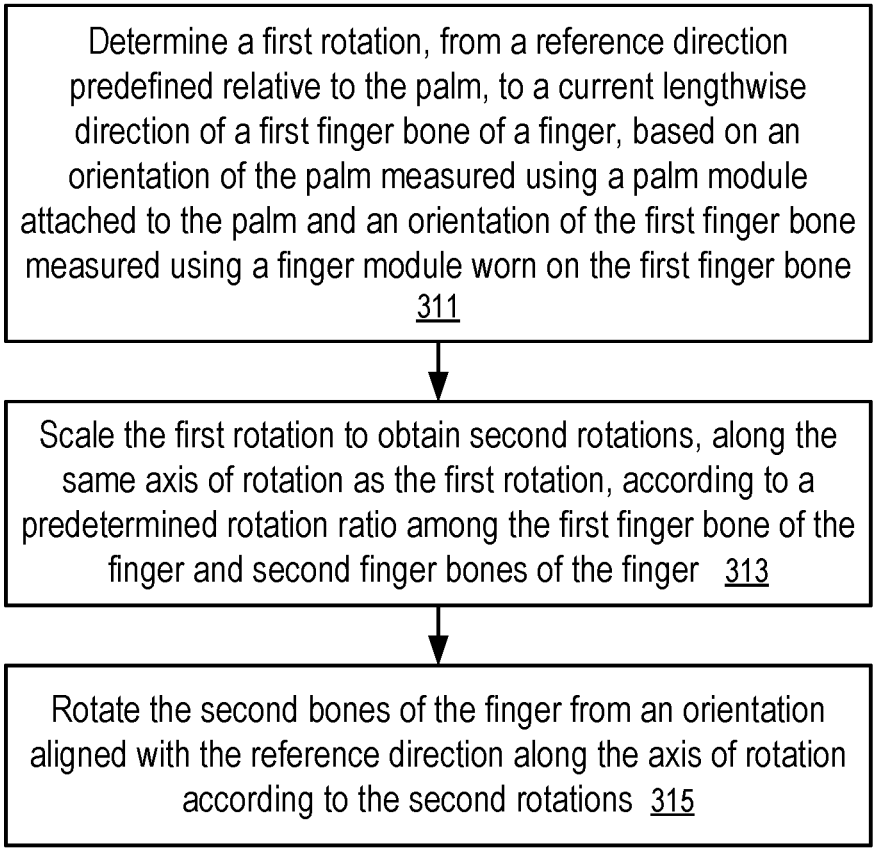
FIG. 6 shows a detailed method to compute the orientation of a finger according to one embodiment.

FIG. 6 shows a detailed method to compute the orientation of a finger according to one embodiment. For example, the method of FIG. 6 can be used to implement the calculation (303) of the orientation of the second bones (e.g., 211, 215; 221, 225; or, 231, 235) in the method of FIG. 5.

In FIG. 6, the calculation (303) of the orientations of the of the second bones (e.g., 221 and 225) is performed by: determining (311) a first rotation $\alpha_2$ (263), from a reference direction n (267) predefined relative to the palm (201), to a current lengthwise direction b (266) of a first finger bone (223) of a finger, based on an orientation of the palm (201) measured using a palm module (108) attached to the palm (201) and an orientation of the first finger bone (223) measured using a finger module (104b) worn on the first finger bone (223); scaling (313) the first rotation $\alpha_2$ (263) to obtain second rotations $\alpha_1$ (261) and $\alpha_3$ (265), along the same axis of rotation as the first rotation $\alpha_2$ (263), according to a predetermined rotation ratio ($\alpha_1:\alpha_2:\alpha_3$) among the first finger bone (223) of the finger and second finger bones (221, 225) of the finger; and rotating (315) the second bones (221, 223) of the finger from an orientation aligned with the reference direction (267) along the axis of rotation according to the second rotations $\alpha_1$ (261) and $\alpha_3$ (263).

The axis of rotation is perpendicular to the reference direction n (267) and the lengthwise direction b (266) of the first finger bone (223).

For example, the orientation of the first finger bone (223) can be rotated alone the axis of rotation by an angle of $-\alpha_2$ to arrive at a reference orientation aligned with the reference direction (267). The orientation aligned with the reference direction (267) can be further rotated alone the axis of rotation by angles of $\alpha_1$ and $\alpha_3$ to obtain the orientations of the second finger bones (221 and 225).

Alternatively or equivalently, the orientation of the first finger bone (223) can be rotated alone the axis of rotation by angles $\alpha_1-\alpha_2$ and $\alpha_3-\alpha_2$ to arrive at the orientations of the second finger bone (221, 223) respectively.

FIG. 4 and FIG. 6 are discussed above in connection with the index finger (220-225) illustrated in FIG. 3. The discussions are applicable to the thumb (210-215), the middle finger (230-235), the ring finger (240-245), and the little finger (250-255).

Preferably, a finger module (102a) for a thumb (210-215) is worn on the proximal phalange (213) of the thumb (210-215) for the tracking of the movement of the thumb (210-215). However, when the finger module (102a) for the thumb (210-215) is worn on the distal phalange bone (215) of the thumb (210-215), the calculation of the orientations of the metacarpal bone (211) of the thumb (210-215) and the proximal phalange (213) of the thumb (210-215) can be calculated in a similar way based on the predetermined ratio of the rotations of the finger bones (211, 213, and 215) of the thumb (210-215).

Similarly, a finger module (102c) for a middle finger (230-235) is preferably worn on the middle phalange (213) of the middle finger (230-235) for the tracking of the movement of the middle finger (230-235). Alternatively, the finger module (102c) for the middle (230-235) can be worn on the distal phalange bone (235), or the proximal phalange bone (231) of the middle finger (230-235) for the orientation tracking/calculation of the bones (231, 233, 235) of the middle finger (230-235).

Optionally, a finger module similar to finger modules (102a-c) can be worn on the ring finger (240-245) for the tracking and calculation of the orientations of the bones (241, 243, 245) of the ring finger (240-245). When the ring finger (240-245) does not wear any finger module, the bones (241, 243, 245) of the ring finger (240-245) can be predicted/estimated to move/rotate in a same way as the bones (231, 233, 235) of the middle finger (230-235).

Optionally, a finger module similar to finger modules (102a-c) can be worn on the little finger (250-255) for the tracking and calculation of the orientations of the bones (251, 253, 255) of the little finger (250-255). When the little finger (250-255) does not wear any finger module, the bones (251, 253, 255) of the little finger (250-255) can be predicted/estimated to move/rotate in a same way as the bones (241, 243, 245) of the ring finger (240-245).

As illustrated in FIGS. 1 and 2, each of the finger modules (104a-c) and the palm module (108) is a sensor module that has an inertial measurement unit (IMU) (102a-c, 102n) for their orientation measurements. Preferably, the sensor modules have at least one wireless communication device or module (112) for a wireless communication link (117) with the computing device (141). Wired (or wireless) connections may be used for communications among the sensor modules. Alternatively, a wired connection between the set of sensor modules and the computing device (114) can be used. The inertial measurement unit (IMU) (102a-c and 102n) of the sensor module (104a-c, or 108) may include a microelectromechanical system (MEMS) gyroscope, a magnetometer, and/or a MEMS accelerometer.

The method of FIG. 6 allows the calculation of the estimated/approximated orientation of finger bones (e.g., 221, 225) without a need for separate inertial measurement units or sensor modules attached to the finger bones (e.g., 221, 225), which arrangement reduces the cost of the system and improves user experiences. The measurement of the orientation of one of the finger bones of a finger can be used to calculate/estimate the orientations of other finger bones that have no attached sensor modules of the finger, according to a predetermined ratio of rotations.

The present disclosure includes methods and apparatuses which perform these methods, including data processing systems which perform these methods, and computer readable media containing instructions which when executed on data processing systems cause the systems to perform these methods.

For example, the computing device (114), the palm module (108) and/or the finger modules (104*a-c*) can be implemented using one or more data processing systems.

A typical data processing system may include includes an inter-connect (e.g., bus and system core logic), which interconnects a microprocessor(s) and memory. The microprocessor is typically coupled to cache memory.

The inter-connect interconnects the microprocessor(s) and the memory together and also interconnects them to input/output (I/O) device(s) via I/O controller(s). I/O devices may include a display device and/or peripheral devices, such as mice, keyboards, modems, network interfaces, printers, scanners, video cameras and other devices known in the art. In one embodiment, when the data processing system is a server system, some of the I/O devices, such as printers, scanners, mice, and/or keyboards, are optional.

The inter-connect can include one or more buses connected to one another through various bridges, controllers and/or adapters. In one embodiment the I/O controllers include a USB (Universal Serial Bus) adapter for controlling USB peripherals, and/or an IEEE-1394 bus adapter for controlling IEEE-1394 peripherals.

The memory may include one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In the present disclosure, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to non-transitory, recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROM), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A system, comprising:
a first sensor module having an inertial measurement unit and attached to a palm of a hand of a user, the first sensor module generating first motion data identifying an orientation of the palm of the user, wherein the hand has a finger including a first bone and second bones;
a second sensor module having an inertial measurement unit and attached to the first bone of the finger, the second sensor module generating second motion data identifying an orientation of the first bone of the finger; and
a computing device coupled to the first sensor module and the second sensor module through one or more communication link, the computing device calculating, based on the orientation of the palm and the orientation of the first bone, orientations of the second bones of the finger,
wherein the orientations of the second bones of the finger are calculated to have rotated along a same axis from a reference orientation as the orientation of the first bone of the finger.

2. The system of claim 1, wherein the finger is a thumb; the first bone is a proximal phalange bone of the thumb, and the second bones are a metacarpal bone and a distal phalange bone of the thumb.

3. The system of claim 1, wherein the finger is one of: an index finger, a middle finger, a ring finger, and a little finger; the first bone is a middle phalange of the finger; and the second bones are proximal and distal phalange bones of the finger.

4. The system of claim 1, wherein each of the inertial measurement unit of the first sensor module and the inertial measurement of the second sensor module includes a microelectromechanical system (MEMS) gyroscope.

5. The system of claim 4, wherein each of the inertial measurement unit of the first sensor module and the inertial measurement of the second sensor module further includes a magnetometer and a MEMS accelerometer.

6. The system of claim 1, wherein the orientations of the second bones of the finger are calculated without an inertial measurement unit attached to the second bones of the finger.

7. The system of claim 1, wherein the computing device calculates the orientation of the forearm by:
determining a first rotation angle, rotating from a predetermined reference direction relative to the palm to a lengthwise direction of the first bone along an axis that is perpendicular to both the predetermined reference direction and the lengthwise direction of first bone;
determining second rotation angles, rotating from the predetermined reference direction along the axis, based on a predetermined ratio among the first rotation and the second rotations; and
rotating the orientation of the first bone according to the second rotations to obtain orientations of the second bones.

8. The system of claim 7, wherein the orientation of the first bone and the orientations of the second bones corresponding to rotation an orientation aligned with the reference direction and by the first rotation angle and the second rotation angles respectively along the axis.

9. A method, comprising:
receiving, from a first sensor module attached to a palm of a hand of a user, first motion data identifying an orientation of the palm, the hand having a finger including a first bone and second bones connected by two finger joints;
receiving, from a second sensor module attached to the first bone of the finger, second motion data identifying an orientation of the first bone of the finger;
calculating, based on the orientation of the palm and the orientation of the first bone of the finger, orientations of the second bones of the finger; and
determining a position of the finger in a three dimensional space based on the orientation of the first bone of the finger, the orientations of the second bones of the finger, and a skeleton model of the hand,
wherein the orientations of the second bones of the finger are calculated to have rotated along a same axis from a reference orientation as the orientation of the first bone of the finger.

10. The method of claim 9, wherein the orientation of the first bone and the orientation of the second bones correspond to rotating a reference orientation along a same axis by a first angle and second angles.

11. The method of claim 10, wherein the orientations of the second bones of the finger are calculated based on a predetermined ratio among the first angle and the second angles.

12. The method of claim 11, wherein the axis is perpendicular to a lengthwise direction of the first bone and a reference direction predetermined relative to the palm.

13. The method of claim 12, wherein the finger is not a thumb; and the reference direction is parallel to the palm and parallel to a direction pointing from a wrist of the hand and the palm.

14. The method of claim 13, wherein the finger is a thumb; and the reference direction is not parallel to the palm.

15. The method of claim 11, wherein the finger is a middle finger of the hand; and the method further comprises:
calculating orientations of bones of a ring finger of the hand based on the orientation of the first bone of the middle finger.

16. A non-transitory computer storage medium storing instructions which, when executed by a computing device, instructs the computing device to perform a method, the method comprising:
receiving, from a first sensor module attached to a palm of a hand of a user, first motion data identifying an orientation of the palm, the hand having a finger including a first bone and second bones connected by two finger joints,
receiving, from a second sensor module attached to the first bone of the finger, second motion data identifying an orientation of the first bone of the finger;
calculating, based on the orientation of the palm and the orientation of the first bone of the finger, orientations of the second bones of the finger; and
determining a position of the finger in a three dimensional space based on the orientation of the first bone of the finger, the orientations of the second bones of the finger, and a skeleton model of the hand, wherein the orientations of the second bones of the finger are calculated to have rotated along a same axis from a reference orientation as the orientation of the first bone of the finger.

17. The non-transitory computer storage medium of claim 16 wherein the orientations of the second bones of the finger are calculated based on a predetermined ratio of rotation angles from the reference orientation for the first bone of the finger and the second bones of the finger.

18. The non-transitory computer storage medium of claim 17, wherein the axis is perpendicular to a lengthwise direction of the first bone in the orientation of the first bone and a reference direction predetermined relative to the palm.

19. The non-transitory computer storage medium of claim 18, wherein when the finger is a thumb, the reference direction is not parallel to the palm; and when the finger is not a thumb, the reference direction is parallel to the palm.

* * * * *